(12) United States Patent
Wasilko (10) Patent No.: US 7,260,606 B1
(45) Date of Patent: *Aug. 21, 2007

(54) ATTENUATION, DELAY, QUEUING, AND MESSAGE CACHING PROCESSES FOR USE IN E-MAIL PROTOCOLS IN ORDER TO REDUCE NETWORK SERVER LOADING

(75) Inventor: Jeff Wasilko, Vienna, VA (US)

(73) Assignee: Time Warner Cable, Inc., Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/548,308

(22) Filed: Apr. 12, 2000

(51) Int. Cl.
*G06F 13/00* (2006.01)

(52) U.S. Cl. ............ 709/206; 709/219; 709/223; 709/225; 709/229

(58) Field of Classification Search ............ 709/206, 709/217, 226, 229, 219, 225, 223, 224
See application file for complete search history.

(56) References Cited

U.S. PATENT DOCUMENTS

| | | | | |
|---|---|---|---|---|
| 5,278,984 A * | 1/1994 | Batchelor | ............ | 709/314 |
| 5,513,126 A * | 4/1996 | Harkins et al. | ............ | 709/228 |
| 5,553,242 A | 9/1996 | Russell et al. | ............ | 395/200 |
| 5,740,230 A | 4/1998 | Vaudreuil | ............ | 379/88 |
| 5,754,778 A | 5/1998 | Shoujima | ............ | 395/200 |
| 5,765,033 A * | 6/1998 | Miloslavsky | ............ | 709/206 |
| 5,796,394 A | 8/1998 | Wicks et al. | ............ | 345/329 |
| 5,828,904 A * | 10/1998 | Batson et al. | ............ | 710/58 |
| 5,832,218 A | 11/1998 | Gibbs et al. | ............ | 395/200 |
| 5,938,725 A | 8/1999 | Hara | ............ | 709/206 |
| 5,948,058 A | 9/1999 | Kudoh et al. | ............ | 709/206 |
| 5,951,636 A * | 9/1999 | Zerber | ............ | 709/202 |
| 5,956,521 A * | 9/1999 | Wang | ............ | 710/35 |
| 5,968,117 A * | 10/1999 | Schuetze | ............ | 709/206 |
| 5,970,491 A | 10/1999 | Schreiber et al. | ............ | 707/10 |
| 5,987,504 A * | 11/1999 | Toga | ............ | 709/206 |
| 6,850,968 B1 * | 2/2005 | Pfeffer et al. | ............ | 709/206 |

FOREIGN PATENT DOCUMENTS

| | | | |
|---|---|---|---|
| JP | 4160950 | | 6/1992 |
| JP | 07-143163 | * | 6/1995 |

* cited by examiner

*Primary Examiner*—David Wiley
*Assistant Examiner*—Alina Boutah
(74) *Attorney, Agent, or Firm*—Roberts Mardula & Wertheim LLC (57) ABSTRACT

Traffic handling load on network servers is moderated by delaying POP checks at proxy servers located across the network. Delay of POP check processing is accomplished by intercepting each POP check packet at a proxy server that is nominally local to where the user is located. The proxy server permits a given user's initial POP check to proceed on through the network to the mail server. Thereafter, though, the proxy server only permits that user's received POP checks to proceed onward only after interjecting a delay in the POP process. Optionally, automatic messages are sent on a daily basis to a user who performs abusively rapid POP checks to inform them that their POP checks are being delayed and/or attenuated and educating them how to modify the configuration of their mail client software.

22 Claims, 6 Drawing Sheets

ATTENUATION, DELAY, QUEUING, AND MESSAGE CACHING PROCESSES FOR USE IN E-MAIL PROTOCOLS IN ORDER TO REDUCE NETWORK SERVER LOADING

RELATED APPLICATION

This application is related to the commonly-assigned, co-pending patent application of Howard Pfeffer and John Leddy entitled Reduction of Network Server Loading, filed Mar. 23, 2000, which has been assigned Ser. No. 09/533,463, and which is incorporated herein by reference in its entirety for all purposes.

BACKGROUND OF THE INVENTION

1. Field of the Invention

The present invention relates generally to the field of data networks. More particularly, the present invention relates to reduction of traffic handling load on network servers by decentralization of mail handling protocols.

2. Background Information

Over the last twenty years, the demand for data network services has grown rapidly. Many large networks have been built by a number of providers to meet the voracious demand for bandwidth to handle data traffic.

Data networks are commonly used for inter alia transmission of electronic mail messages (hereinafter e-mail). According to Post Office Protocol (hereinafter POP) standard for e-mail handling, transmitted e-mail messages are routed to a centralized mail server facility. Those e-mail messages are warehoused at the centralized mail server until retrieved by their intended recipients. A user retrieves their e-mail messages from the mail server by sending an inquiry message via the network to the mail server asking if there is any mail stored there for them. Commonly these inquiry messages sent to the mail server are known as "POP checks" because they check for mail according to the Post Office Protocol. If the user's mail box is empty, then the mail server sends a negative response to the user telling him so. On the other hand, if the mail server is storing mail messages for the user, those messages are transmitted (in response to the POP check) to the user via the network.

One problem with large data networks where the clients are connected at all times without having to create a dial up connection is the large amount of network traffic due to frequent POP checks that users make (or, more typically, that the users' computers makes on the users' behalf) to see if there are any new e-mail messages waiting for them on the mail server. The use of a POP3 mail system in a wide area network (WAN) may result in a large amount of network traffic. This is not only a bandwidth problem, but also causes a substantial loading on the servers across the network that have to handle and route all this largely unproductive traffic. When a mail server is remote from the mail client, each POP3 request may require numerous hops to transverse the network, and response must travel the same distance.

It is largely unproductive traffic because the vast bulk of POP checks (over 90%, typically) result in negative responses because POP checks are generated much more frequently than the frequency with which e-mail messages arrive at the mail server. This is very inefficient. Significant traffic handling server load reduction, and some bandwidth savings, can be made if most POP checks are terminated close in the network to the sender.

Thus, what is needed is a scheme for reducing the number of POP checks that are transmitted over the network to the mail server.

Another e-mail related problem in networks is that the bandwidth demand resulting from e-mail traffic is concentrated during certain times of the day. In particular, the morning hours are a concentrated time for retrieval of e-mail messages from the mail server. These e-mail-generated spikes in bandwidth demand present network management challenges. One typical solution is to increase bandwidth capacity of the network to accommodate demand spikes completely. Obviously, this is an expensive and inefficient option because the added capacity will go largely unused (except in the event of demand spikes). Another typical solution is to simply permit poor network performance during periods when bandwidth demand spikes. Obviously, this option would be a source of irritation to the users of the network.

Thus, what is needed is a scheme to accommodate e-mail retrieval traffic without adding capacity that will go largely unused and without reducing network performance.

SUMMARY OF THE INVENTION

It is an object of the present invention to a scheme for reducing the number of POP checks that are transmitted over the network to a POP mail server.

It is another object of the present invention to scheme to accommodate e-mail retrieval traffic without adding capacity that will go largely unused and without reducing network performance.

It is yet another object of the present invention to efficiently distribute e-mail handled according to a POP system.

It is still another object of the present invention to push bandwidth demand and traffic handling load toward the edges of a wide area network.

The present invention addresses this problem with three approaches that may be used separately or together. The first is to attenuate the POP checks. The second is to delay the POP checks. The third is to cache the e-mail messages.

Attenuation of POP checks is accomplished by intercepting each POP check packet at a proxy server that is nominally local to where the user is located. The proxy server lets the user's first POP check proceed on through the network to the mail server. Thereafter, though, the proxy server only permits that user's received POP checks to proceed onward according to a predetermined algorithm. For example, the proxy server may only permit a POP check to proceed to the mail server if it has been at least fifteen minutes since the last time the mail server was actually checked for e-mail by that particular user. When overly frequent POP checks by that user are received prior to the permitted time, no actual check of the mail server is permitted and the proxy server simply informs the user that he has no mail (despite not knowing deterministically whether that is a true statement).

As with attenuation, delay of POP checks is accomplished by intercepting each POP check packet at a proxy server that is nominally local to where the user is located. Although an initial POP check is permitted to proceed on through the network to the mail server, if the frequency of subsequent POP checks is greater than a threshold, they are placed in a delay queue and processed with a delay inserted into the signaling. This delay can be a fixed value or a variable that changes with client POP habits. This delay can be inserted for a single POP command or for multiple of the POP session commands depending on the total amount of delay desired. The effect of this delay is to increase the time that it takes for a POP session to complete. An advantage of this technique is that the state of the mailbox is accurately and deterministically reported.

According to the cache aspect of the invention, a user's e-mail is cached at the proxy server nearest to his presumed location. This decentralizes the e-mail storage away from the mail server and spreads it out over the network at the various proxy servers. This cache action is preferably done when there is a lull in network traffic (e.g., at night). This can also be done as soon as mail is available so that the proxy deterministically knows that a client has unread mail. This also has the effect of decentralizing the bandwidth demand on the overall network since the e-mail messages have a shorter distance to travel when retrieved by the user from the cache location at the proxy server.

BRIEF DESCRIPTION OF THE DRAWINGS

Additional objects and advantages of the present invention will be apparent in the following detailed description read in conjunction with the accompanying drawing figures.

DETAILED DESCRIPTION OF THE INVENTION

Typical e-mail client programs support a feature that performs automated mailbox checking at configurable intervals. A user may set their e-mail program to query for new mail every five minutes, for example. The "always on" characteristic of a broadband Internet service enables a subscriber to leave their e-mail program running and continuously polling for mail. This adds further to the load of POP3 packets on the service provider's network. And, while polling intervals will vary, empirical observation shows that over 90% of the mailbox queries return no new mail. This problem of empty POP checks is addressed by the attenuation aspect of the present invention.

Attenuation of POP checks is accomplished by a proxy server, which implements a software proxy. The proxy server intercepts POP requests that originate with its locally situated network component. As a proxy, it responds to a majority of these POP checks based on its most recent knowledge of the state of the requestor's actual mailbox. The proxy server uses an "attenuation interval" of n minutes. Thus, every n minutes it will allow a mail query session (i.e., POP check) to flow through to the actual mail server. If the mailbox is empty after this session, the proxy server will note that, and will return "mailbox empty" responses to all POP checks for that mailbox for the next n minutes, after which it will permit the subsequent POP check packet to flow through for that mailbox, and so continue the pattern.

Generally speaking, the proxy server permits a user's first POP check to proceed on through the network to the mail server. Thereafter, though, the proxy server only permits that user's received POP checks to proceed onward according to a predetermined algorithm. For example, the proxy server may only permit a POP check to proceed to the mail server if it has been at least fifteen minutes since the last time the mail server was actually checked for e-mail by that particular user. When overly frequent POP checks by that user are received prior to the permitted time, no actual check of the mail server is permitted and the proxy server simply informs the user that he has no mail (despite not knowing deterministically whether that is a true statement).

While it is a worthy object to moderate the amount of traffic handling that is required by the servers in a network, the attenuation solution should be implemented with respect for the concerns of the e-mail users. Under certain circumstances, an e-mail user may observe that the attenuation algorithm as described above may cause some delay in how quickly they receive their e-mail messages. The user may perceive this not as an optimization but, rather, as poor service. Accordingly, there is a need to accommodate the expectations of the e-mail users to the extent possible.

One simple way to avoid user perception of delay service of e-mail messages is to set the interval of n minutes at which POP check flow through is permitted as low as possible. In fact, the value of n can be set dynamically, based on overall network load, so that it is low when network load is light and set higher when network load peaks.

An optional feature of this attenuation process is that a custom SMTP extension may provide an event service whereby the proxy server can receive notification when new mail arrives for any mail account on the mail server for which it is acting as an attenuation proxy. In case of such an event notification, it will permit the subsequent POP check packet to flow through for that mailbox.

Another optional algorithm is to permit POP checks to flow through based upon the number of POP checks that have been received for a given e-mail account. In other words, only one out of every m POP checks is permitted to flow through to the mail server. For obvious reasons, this is not a preferred method. It is mentioned simply because of the ease with which it could be implemented.

Another way to manage user expectations is to tell a user that his e-mail service is being attenuated. This is implemented by causing the proxy server to automatically send an e-mail message to affected users on a regular basis (e.g., once a day, or any other choice of programmable period). The contents of the e-mail communicate to the user that their frequent POP checks are placing unproductive load on the system and that the excessive checks will be attenuated.

Preferably, message also notifies the recipient that as they reduce the frequency of their POP checks they will no longer be attenuated and directs them to a web page with details on how to set the frequency in their e-mail client software. Additionally, instructions on how to modify email client preferences or a reference to other documentation such as a user guide may be contained in the notification email. The reference to other documentation is preferably embodied as a link to a web page that provides relevant instructions.

The preferred attenuation algorithm is a combination of a time-based rule (i.e., wait n minutes before letting another POP check through) and a demand-based rule (i.e., let the next POP check through only if notice of actual mail receipt has been received from the mail server). Although the demand-based rule alone may appear to be adequate, the combination with a time-based rule ensures that e-mail still gets checked in the event that the notification message from the mail server is not sent or fails to be routed to the proxy server. The redundant use of the two rules provides a more robust system, and minimizes the chances of causing user dissatisfaction with e-mail service.

The attenuation aspect of the present invention preferably makes a deterministic assessment of whether an e-mail account being attenuated actually has any new e-mail messages to be retrieved. One method is for the proxy server to snoop the actions of the POP protocol and keep track of how many messages are read from the mail server and how many were deleted from the mail server.

A simpler method to accomplish this is to wait until the e-mail client ends the e-mail session. This happens when the e-mail client transmits a "quit" message. Rather than letting the quit message flow through immediately, the proxy server temporarily retains the quit message while it determines the status of that e-mail account. While the quit command is being held, the proxy server sends a "stat" command to the mail server asking, in essence, "Do you have mail for me?" If the answer received from the mail server is "no," then the proxy server knows deterministically that the e-mail client has no un-retrieved messages. This status is cached locally at the proxy server. Subsequently, the quit message is permitted to travel onward through the network to the mail server.

One algorithm for implementing the attenuation aspect of the present invention uses a set of tables. When a new user checks their e-mail account on the mail server (i.e., sends an initial POP check), the proxy server places that user in an attenuation table. Assuming that the state of the user's mailbox is determined, a timer is started when the user is placed in the table. The user remains in the table until the timer times out. Each time the user transmits a POP check, their POP check is attenuated at the proxy server if the user still remains listed in the table. In other words, until the timer times out and removes the user from the attenuation table, that user's mail client software will continue to receive pseudo responses to its POP checks telling the user that the mail server has no mail for that account.

Another triggering event for removing the user from the attenuation table is if a notification message is received from the e-mail server than the user has mail. By being removed from the table, the user's next POP check is passed through to the mail server.

Every time the user is removed from the attenuation table (for whatever reason: time out, notification, server reset, etc.) that user's next POP check is permitted to flow through to the mail server. Concurrently, the transmission of that POP check places the user back into the attenuation table and re-starts the timer. In this way, the user's own actions re-establish the state in an attenuation queue.

In forming the tables in this implementation, the username information is cached. To avoid the need to perform linear searches, a hash table algorithm is used. Each hash entry in the table is a fixed length value, e.g., a five hash, created according one of plural hash algorithms that are well known in the database art. These hashes are used as keys for entry in a hash table. The first time a POP check is seen from a user, that user's username is hashed and entered as an entry in the hash table. The hash table uses the key-value pair. The key is the hash, and the value is the pointer to a small data structure somewhere in the proxy server's memory. The data structure contains the username in clear text, as well as the user's password in clear text. The data structure also may contain information indicating the state of the user's mailbox, and a value indicating the elapsed time left for that user.

This implementation also uses another table, which is an ordered table that indicates which one of the hash values (indicative of the individual users) will expire next. The ones that will expire soonest are placed at the top of the ordered table, and the ones that will expire last are placed at the bottom of the ordered table. The ordered table may be thought of as a timer list.

Thus, when a user first checks for e-mail, their username is hashed and the hash is placed both in a hash table and at the end of the timer list ordered table. An algorithm then regularly checks the timer list to see if one or more of the hashes at the top of the list have timed out.

A more detailed discussion of this preferred implementation is discussed as follows.

The attenuation algorithm has two main logical components—a table of users and a finite state machine. The finite state machine represents the logic that maps to any particular combination of user state and POP3 command.

The user table is a hash table where the hash key is the user's mailbox account name for the POP3 server that the proxy server is proxying. A user's entry in the table has attributes, including mailbox password (may be encrypted or plain text), a time stamp of the last time the mailbox was verified as empty, state (where the state is the user's current state in the sequence of commands that make up a POP3 session), lock flag, terminate flag, timeout field, etc.

States, Events, and Actions

What follows is a list of possible states for a POP3 attenuation session, and the actions and state transitions that result from various events, where the main event type is a POP3 command. A session associates a command with a mailbox username/usertable entry; although the POP3 user command is the only command that carries that name, an implementation mechanism can make this association for subsequent commands within the session.

None State. Event: POP3 proxy server receives the user command, but there is no corresponding entry in the user table. The POP3 proxy server creates a table entry for this user, forwards the command to the POP3 mail server, and returns the response to the client. The state transitions to Authorization.

Idle State. Event: POP3 proxy server receives the user command and finds a corresponding entry in the table. Sends +OK response to the client. The state transitions to Authorization.

Authorization State. Event: The POP3 proxy server receives the pass command.

If the Lock flag equals true, send response: -ERR Your mail box is locked by another POP3 session. The state remains as Authorization.

If the password sent equals the password attribute in the user table entry and the time elapsed since the last-time-mailbox-empty time stamp is less than the global attenuation interval, set the terminate flag to true. Additionally, set the Lock flag to true, start the Session Timer to wait for possible timeout, and send a +OK response to the client. The state transitions to Transaction.

If the password sent equals the password attribute in the user table entry and the time elapsed is greater than the global attenuation interval, set the Terminate flag to false. Additionally, send the user command to the POP3 mail server, wait for a response, send the pass command, and wait for a response. Return the response to the client. If the response from the server is -ERR, the state does not change. If the response is +OK, the state transitions to Transaction.

If the password sent does not equal the password attribute in the user table entry, send the user command to the POP3 server, wait for a response, send the pass command, and wait for a response. Return the response to client. IF the response from the server is -ERR, the state does not change. If the response is +OK, save the new password; the state transitions to Transaction.

Authorization State. Event: The POP3 proxy server receives the quit command. The Lock flag is set to false. The state transitions to idle.

Transaction State. Event: The POP3 proxy server receives any of these commands:

stat—If the terminate flag equals true, the POP3 proxy server returns +OK 0 0. This tells the client that their mailbox is empty. If the terminate flag equals false, the POP3 proxy server forwards the request to the POP3 mail server and returns the response to the client. The state remains as Transaction.

list—If the terminate flag equals true, the POP3 proxy servers returns -ERR no such message. If the terminate flag equals false, the POP3 proxy server forwards the request to the POP3 mail server and returns the response to the client. The state remains as Transaction.

retr—If the terminate flag equals true, the POP3 proxy server returns -ERR no such message. If the terminate flag equals false, the POP3 proxy server forwards the request to the POP3 mail server and returns the response to the client. The state remains as Transaction.

dele—If the terminate flag equals true, the POP3 proxy server returns -ERR no such message. If the terminate flag equals false, the POP3 proxy server forwards the request to the POP3 mail server and returns the response to the client. The state remains as Transaction.

noop—The POP3 proxy server returns +OK. The state remains as Transition.

rset—The POP3 proxy server returns +OK. The state remains as Transition.

top—If the terminate flag equals true, the POP3 proxy server returns -ERR no such message. If the terminate flag equals false, the POP3 proxy server forwards the request to the POP3 mail server and returns the response to the client. The state remains as Transaction.

uidl—If the terminate flag equals true, the POP3 proxy server returns -ERR no such message. If the terminate flag equals false, the POP3 proxy server forwards the request to the POP3 mail server and returns the response to the client. The state remains as Transaction.

quit—If the terminate flag equals true, the POP3 proxy server returns +OK. The Lock flag is set to false, and the state transitions to Idle. If the terminate flag equals false, the POP3 proxy server sends a stat command to the POP3 mail server, to retrieve the number of messages now in the mailbox. If the number is 0, the program sets the last-time-mailbox-empty time stamp to the current time; else it sets the time stamp to NULL. Then it sends quit to the POP3 mail server, and returns the result to the client. The Lock flag is set to false, and the state transitions to Idle.

Transaction State. Event: The POP3 Attenuation Session Timeout Event. The timer popped for a locally terminated session. The POP3 proxy server ends the session connection. The Lock flag is set to false, and the state transitions to Idle.

Garbage Collection

The proxy server performs a garbage collection function. That is, at configurable intervals, or in case of need, it may delete all inactive entries in its user table. A case of need is defined, for example, as a user table that has become full. Other definitions are possible.

After the garbage collection, the proxy server can rebuild its user table, as new POP checks come in.

Opt Out List

The proxy server may optionally support an Opt Out List. This is simply a list of user mailbox account names that won't be subject to proxy treatment. All POP3 commands for names on this list are passed through to the POP3 mail server.

The Fast Check Case

The proxy server may optionally support "fast check" logic to account for a case where a user knows that he has new mail (through some non-POP3 source of knowledge, as for example, when has just sent an e-mail to himself), and where he does rapid and repeated new mail checks within a short interval, to get the mail as soon as possible.

The basic function of the "fast check" logic is to keep track of the time of each new mail query of a user. If a certain number, say three checks, came through in a short interval, such as 30 seconds, the third check could be permitted through to the mail server. This would reward the user's persistence. However, if the user continued to check rapidly after the third (where third is used as one example of a configurable value) check, subsequent checks would be terminated locally until another, longer, interval had expired. This would limit the effect of excessive, automated, or potentially malicious querying.

One way to discriminate the difference between fast checks that are the product of persistent manual checking by the user and automated checks where the check interval has been set unreasonably low (e.g., one every five seconds) is to assess the periodicity of the checks. If the time interval T between the quickly repeated checks is metronomically regular, then it is adjudged to be nothing more than automated checking. On the other hand, if the time interval T varies substantially, then it is adjudged to be manual fast checking. Some permissiveness is allowed for rewarding the persistence of a user who is fast checking manually. However, fast automated checks are attenuated ruthlessly.

Figure 2:
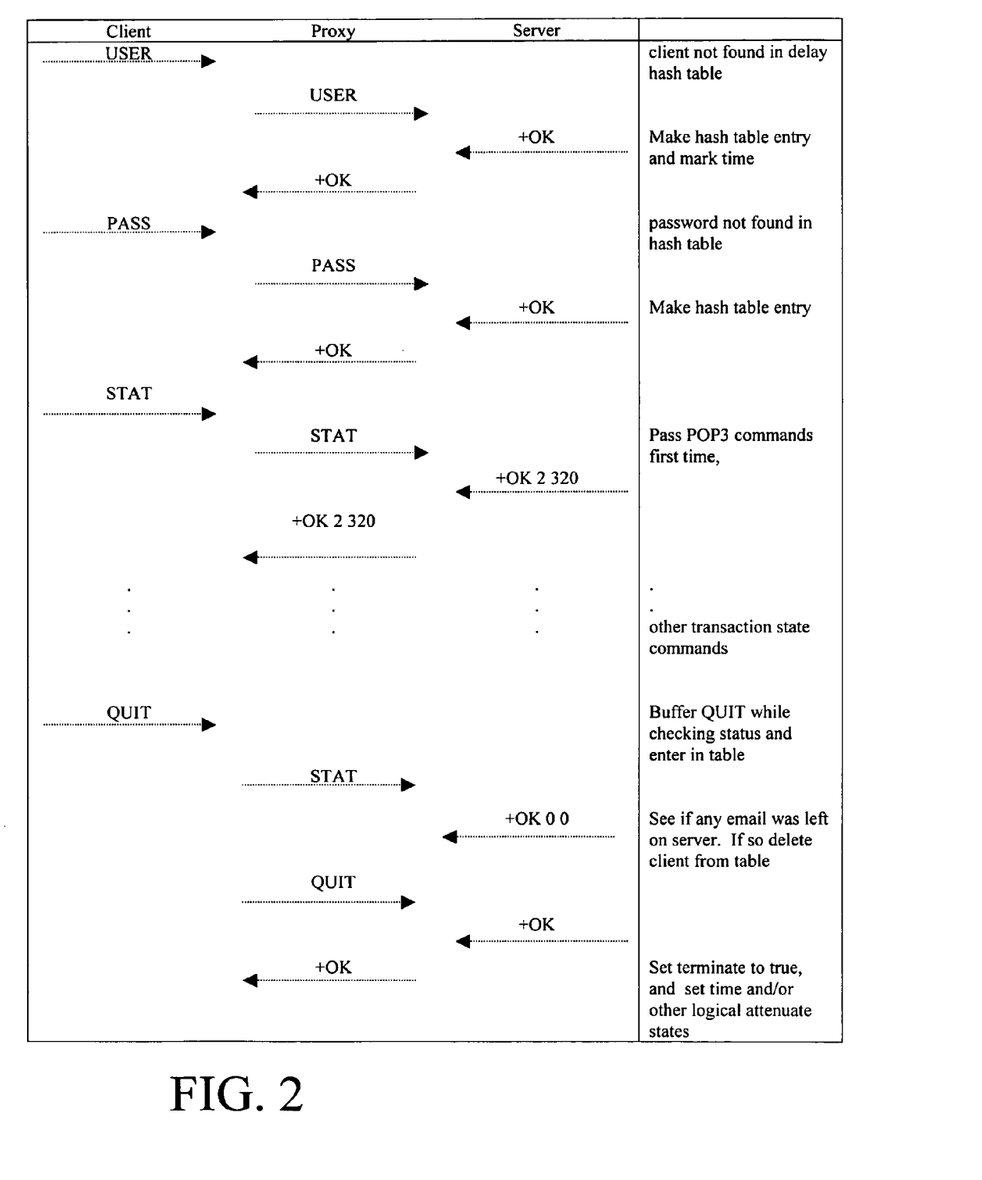
FIG. 2 illustrates a logical implementation for a subset of the signaling transactions that take place between a client, a proxy server, and a mail server according to an embodiment of the present invention.

Referring to FIG. 2, a logical implementation for a subset of the signaling transactions that take place between a client, a proxy server, and a mail server is illustrated. The signal transactions shown are appropriate for the case where the mail client does not already exist in the table.

Figure 3:
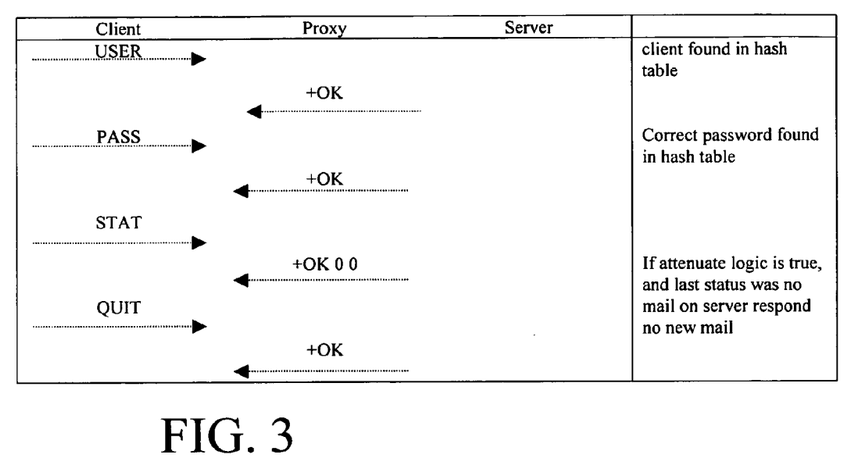
FIG. 3 illustrates a logical implementation for another subset of the signaling transactions that take place between a client, a proxy server, and a mail server according to an embodiment of the present invention.

Referring to FIG. 3, a logical implementation for another subset of the signaling transactions that take place between a client, a proxy server, and a mail server is illustrated. The signal transactions shown represent the case where the mail client is being attenuated (i.e., is in the table).

Figure 4:
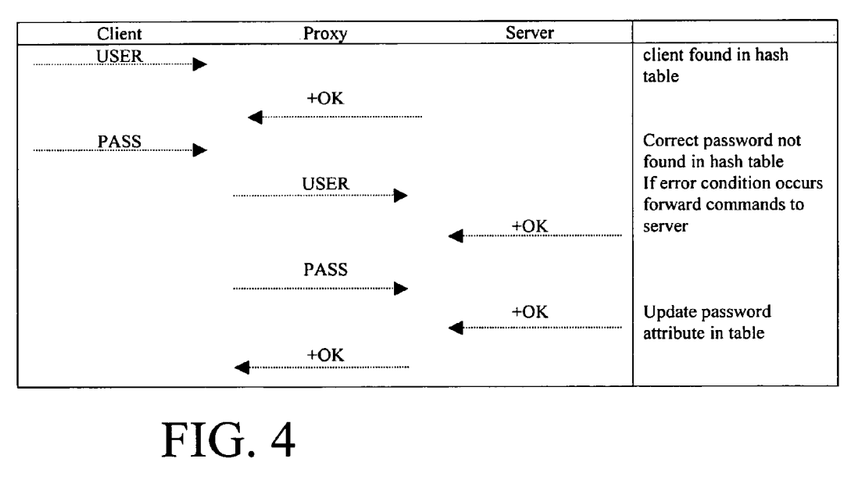
FIG. 4 illustrates a logical implementation for a subset of the signaling transactions that take place between a client, a proxy server, and a mail server according to an alternate embodiment of the present invention.

Referring to FIG. 4, a logical implementation for yet another subset of the signaling transactions that take place between a client, a proxy server, and a mail server is illustrated, according to an embodiment of the present invention. The signal transaction shown handles the situation where the client has changed their password.

Figure 5:
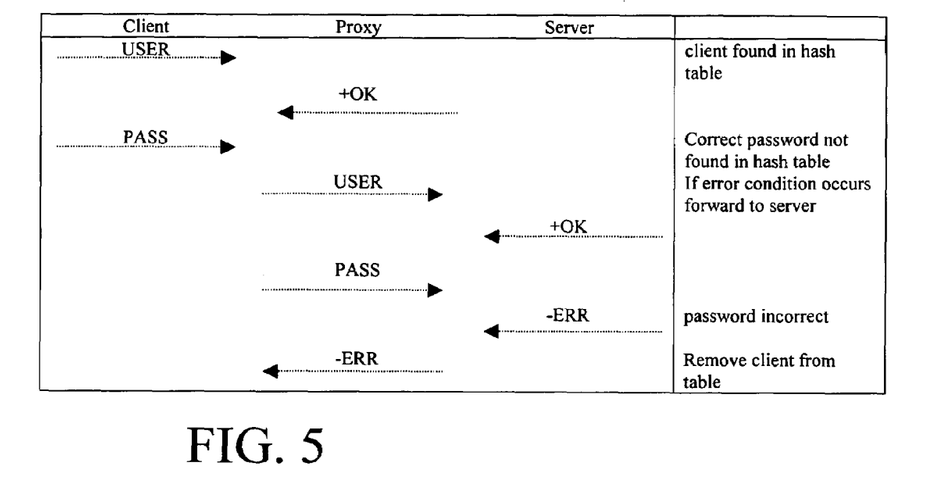
FIG. 5 illustrates a logical implementation for a subset of the signaling transactions that take place between a client, a proxy server, and a mail server according to a further alternate embodiment of the present invention.

Referring to FIG. 5, a logical implementation for still another subset of the signaling transactions that take place between a client, a proxy server, and a mail server is illustrated, according to an embodiment of the present invention. The signal transaction shown handles the situation where an erroneous password is used.

Figure 6:
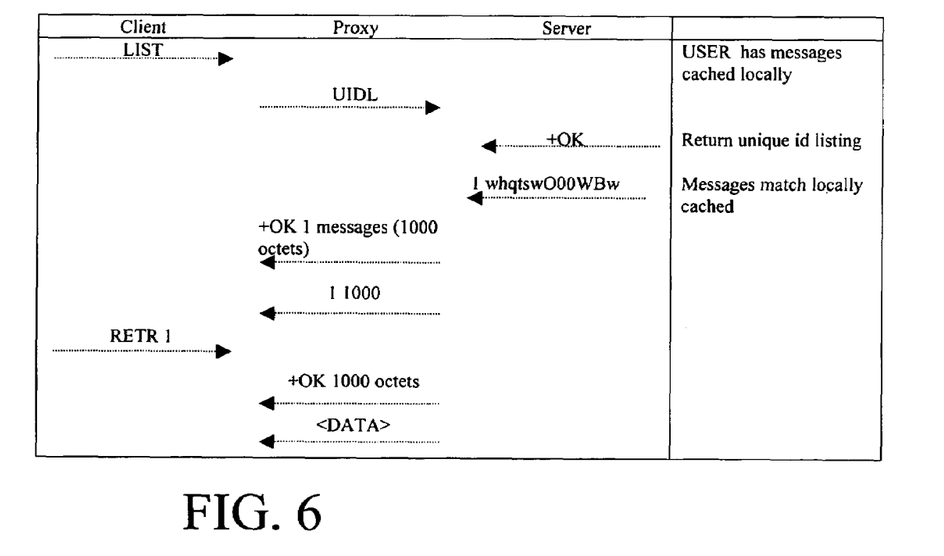
FIG. 6 illustrates a logical implementation for a subset of the signaling transactions that take place between a client, a proxy server, and a mail server according to another alternate embodiment of the present invention.

Referring to FIG. 6, a logical implementation for an additional subset of the signaling transactions that take place between a client, a proxy server, and a mail server is illustrated. The signal transaction illustrated implements synchronization for cache in transaction state (wherein messages have been cached).

Figure 7:
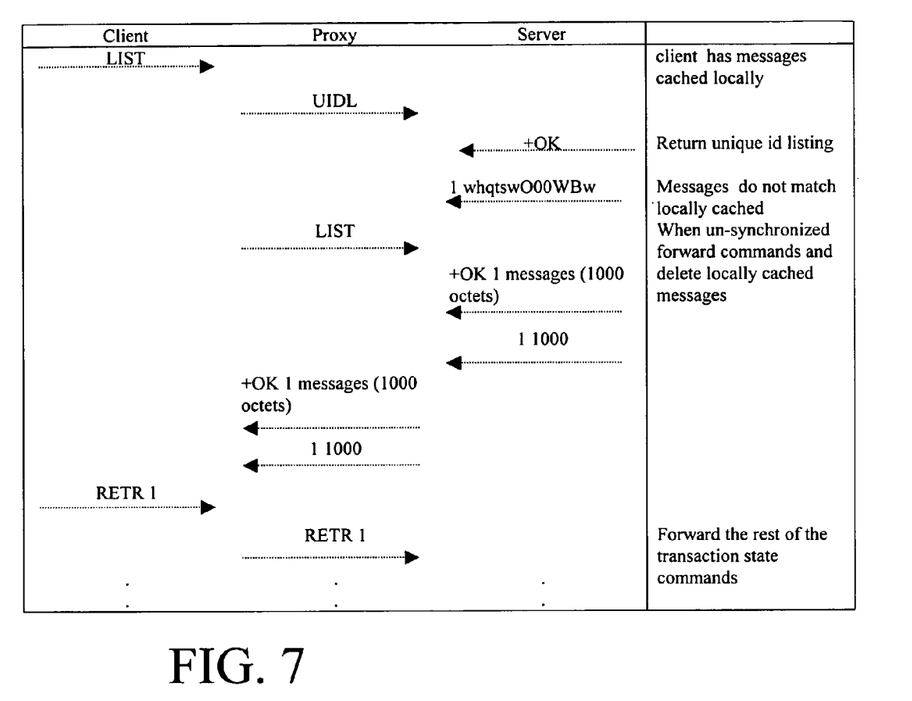
FIG. 7 illustrates a logical implementation for a subset of the signaling transactions that take place between a client, a proxy server, and a mail server according to still another alternate embodiment of the present invention.

Referring to FIG. 7, a logical implementation for a further subset of the signaling transactions that take place between a client, a proxy server, and a mail server according to an embodiment of the present invention. Possible synchronization for cache in transaction state (messages have been cached)

Preferably, the present invention is implemented according to soft state principles. Each proxy server should be able to build up its state from the information around it, without need for extensive backing up of previous state information. From an initial state of not knowing anything about user's or their accounts, the proxy server gradually learns and builds a knowledge base, using only the algorithms it is programmed to implement and observation of the POP mail processes that occur around it.

For example, when a first POP check for an e-mail account is received by the proxy server (assuming it is starting from a no memory state), the proxy server permits the POP check to flow through to the mail server and starts to build a list. The proxy server determines the state of the mailbox and then keeps track of the state information. As this process repeats for different users, the proxy server builds up a table of users and the state of their respective mailboxes. This self-teaching aspect of soft state operation eliminates the need for expensive state back-up resources to store state information for later retrieval in the event of failure of the proxy server. A dead proxy server may simply be replaced by a similar machine what will teach itself what it needs to know.

The network traffic management goals of the above-described attenuation process may also be accomplished by delay of the POP checks. Instead of using the proxy server to report no new mail as disclosed above, the proxy server inserts a delay into the processing of the POP commands. As previously disclosed the first pop check results in the user being entered into a delay table. The user remains in the table for a time=N, where N is the desired allowable period between POP sessions. After time N the user will be dropped from the delay table.

This delay is preferably a variable that changes with client POP habits, or optionally the delay is a fixed value. Depending on the total amount of delay desired, this delay is inserted for a single POP command or for multiple of the POP session commands. The effect of this delay would be to increase the time that it takes for a POP session to complete.

While the delayed session is ongoing most email clients will not initiate a new session until the old session has been completed. If a new session is initiated, the protocol lock flag has been placed on the mailbox and an error will be sent -ERR Mailbox already open, for which the client will realize the last session is still open.

This delay should be less than the timeout setting in the POP3 client to avoid having the client report a timeout error. To allow for low settings of client timeout a small amount of delay can be added to multiple steps in the POP command. As mentioned above, the amount of delay can be set to a variable based on a user's POP check habits. That is, the amount of delay is programmable based on the frequency of POP checks. If the user is checking more frequently than desired for optimal network loading, the amount of delay is increased to keep the client from creating (or at least contributing to) overwhelming load. The delay is gradually decreased when the client reduces the frequencies of the POP checks. The quick check logic discussed above with regard to attenuation is also applicable to implementation of a POP delay scheme.

Figure 8:
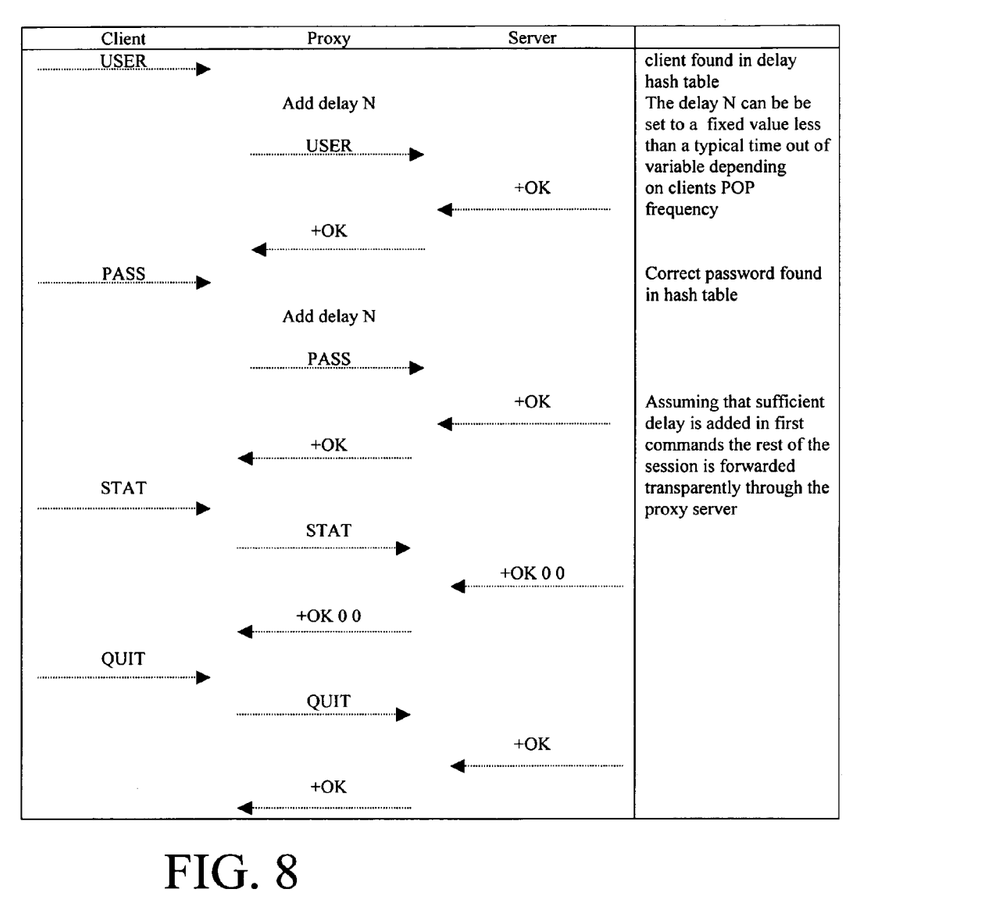
FIG. 8 illustrates a logical implementation for a subset of the signaling transactions that take place between a client, a proxy server, and a mail server according to yet another alternate embodiment of the present invention.

Referring to FIG. 8, a logical implementation for a subset of the signaling transactions that take place between a client, a proxy server, and a mail server is illustrated. The signal transactions shown represent the case where the mail client is being delayed (i.e., is in the delay table).

E-mail traffic load varies with time. There is little that can be done to control when e-mail messages are transmitted to a POP mail server. However, there is some opportunity to manipulate the traffic patterns for how and when e-mail is distributed from the mail server to the intended recipients. This may be exploited to minimize peak traffic loads to the extent that the load is caused by retrieval of e-mail messages.

According to the cache aspect of the invention, a user's e-mail is cached at the proxy server nearest to his presumed location. This decentralizes the e-mail storage away from the mail server and spreads it out over the network at the various proxy servers. This cache action is preferably done when there is a lull in network traffic (e.g., at night). This also has the effect of decentralizing the bandwidth demand on the overall network since the e-mail messages have a shorter distance to travel when retrieved by the user from the cache location at the proxy server.

By this cache action, the user's mail is moved out to the edges of the network ahead of when the user will be seeking to retrieve it. In a sense, the mail messages are pushed to the user, at least part of the way, to a proxy server near where it is presumed that the user will connect to the network when he seeks to retrieve his e-mail. This presumption will not always be accurate, however, since users are free to connect to the network at geographically diverse points (e.g., when they are traveling). More often than not, though, the presumption should be accurate.

One algorithm for choosing which proxy server to push a given user's e-mail to is to always assume that the same proxy server (entered in the user's profile as their "home" proxy server) will be appropriate. This algorithm does not adapt to a user's changing position. This algorithm relies only upon a default user profile as a reference, not a dynamic state table.

Another algorithm for choosing which proxy server to push a given user's e-mail to is to select the proxy server that is the most proximate to the last known point on the network where the user accessed the network. This algorithm is dynamic and adapts to a user's changing geographic position. However, this algorithm is not completely consistent with a soft state approach where there is no reliance upon keeping a memory of previous state information. In the event of a loss of state information, the system may default to the algorithm described in the preceding paragraph.

In the event that the mail cache algorithm is wrong and sends email to the wrong proxy server to be cached, the user logging onto the network at another place (and interacting via an entirely different proxy server) may still retrieve the messages from the mail server. That is because the mail server does not delete the messages from its memory when it pushes the messages out to a selected proxy server. Until retrieved (from one server or another), the messages are redundantly stored on both servers simultaneously.

This redundant storage of e-mail messages raises issues of possible unsynchronized states. An unsynchronized state occurs when a user has read and deleted some messages from one server, but redundant copies of those messages remain stored on another server. This could result in a confusing situation where the user will retrieve a message that has already been retrieved and deleted in a previous e-mail session. To avoid such confusing occurrences, a synchronization algorithm may be used.

A synchronization algorithm according to one embodiment of the present invention makes use of unique identifiers (UIDs) that are assigned to each message. When e-mail messages are retrieved from a server (either from a proxy server or from the centralized mail server), a synchronization handshake occurs between the mail server and the relevant proxy server.

For example, if cached messages are retrieved from a proxy server, a synchronization inquiry is sent from the proxy server to the mail server inquiring whether the mail server contains messages in that user's mail box with the UIDs that match those of messages that the user has just retrieved locally. If there is identity of UIDs between the proxy server's cache mail box and the mail server's central mail box, then the user is served the locally cached copies of the messages. When the user deletes a message, that message is deleted from both servers virtually simultaneously (allowing for transmission delay across the network). However, if there is a difference between the UIDs of messages residing on the two servers, the locally cached messages are thrown away and the messages stored at the mail server are retrieved for the user. In this manner, any confusion or conflict is avoided.

Figure 1:
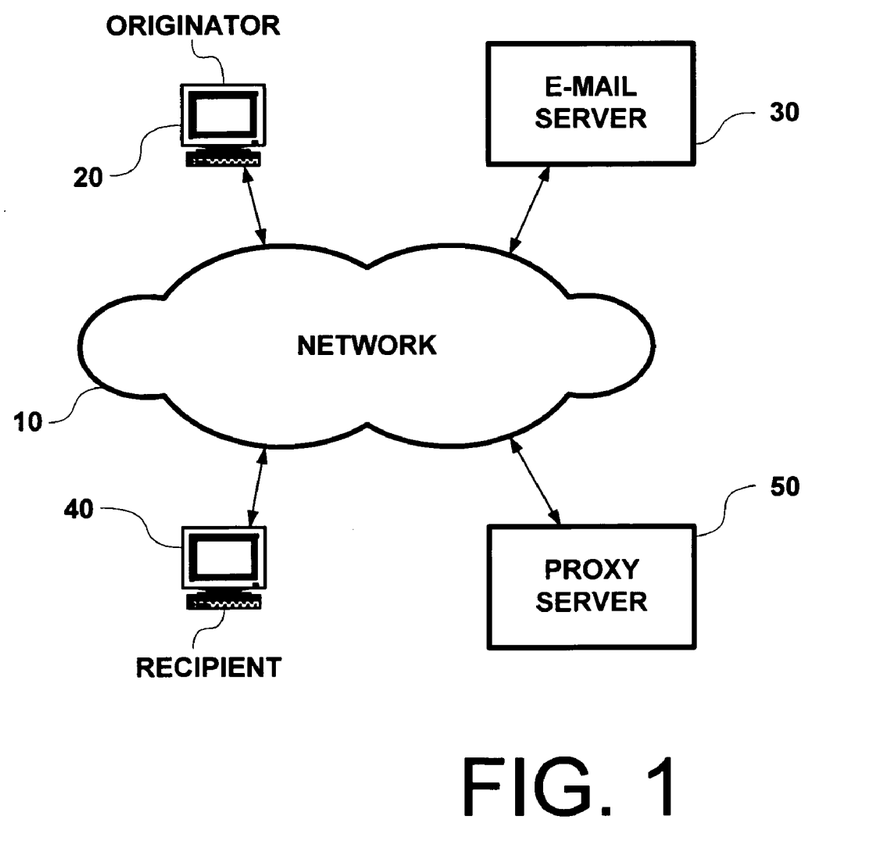
FIG. 1 illustrates a network diagram implementing proxy handling of e-mail according to an embodiment of the present invention.

Referring to FIG. 1, a network diagram illustrates how proxy handling of e-mail may be implemented according to an embodiment of the present invention. An e-mail message originates from an originator client 20, addressed to the e-mail account of an intended recipient client 40. The e-mail message travels from the originator 20, via a network 10, to an e-mail server 30. The process by which the e-mail message travels from the mail server 30 to the recipient 40 follows one of two general scenarios.

In the event that the recipient 40 is not operating their e-mail client software contemporaneously with the receipt of the e-mail message by the mail server 30, the e-mail message may be cached. When traffic load on the network ebbs, the e-mail message is cached at a proxy server 50, which is nominally local to the recipient 40. When the recipient 40 subsequently initiates their e-mail client software, the recipient transmits a POP check (via the network 10) that is intercepted by the proxy server 50. In reply to the POP check, the proxy server 50 transmits to the recipient 40 the cached e-mail message and informs the e-mail server 30 that that message may be deleted from the e-mail server's memory.

In the event that the recipient 40 is operating its e-mail client software contemporaneously with the receipt of the e-mail message by the mail server 30, the e-mail message is retrieved from the e-mail server 30 subject to any POP delay activity that the proxy server 50 may perform. When the proxy server 50 permits a POP check from the recipient to pass through to the e-mail server 30, the e-mail server 30 transmits the e-mail message over the network 10 directly to the recipient 40.

The above description has made specific reference to POP protocols, however, the present invention is equally applicable to any mail protocol implemented in a network.

The present invention has been described in terms of preferred embodiments, however, it will be appreciated that various modifications and improvements may be made to the described embodiments without departing from the scope of the invention. The scope of the present invention is limited only by the appended claims.

What is claimed is:

1. A method of moderating traffic load on network servers in a network where electronic mail is retained for retrieval from at least one mail server, the method comprising:
   permitting a mail request for a mail client to pass through a proxy server to the mail server; and
   delaying subsequent mail requests for the mail client at the proxy server until a predetermined condition has been satisfied, wherein delaying subsequent mail requests is achieved by inserting multiple delays that are inserted at different points in a mail protocol.

2. The method of claim 1, wherein the predetermined condition is a predetermined period of time.

3. The method of claim 2, wherein the predetermined period of time is dynamically determined based on the amount of traffic load on the network.

4. The method of claim 2, wherein the predetermined period of time is dynamically determined based on past behavior of the mail client.

5. The method of claim 1, wherein the predetermined condition is a combination of a predetermined time period and receipt of a notification from the mail server that mail has been received for the mail client at the mail server, whichever occurs first.

6. The method of claim 5, wherein the predetermined period of time is dynamically determined based on the amount of traffic load on the network.

7. The method of claim 5, wherein the predetermined period of time is dynamically determined based on past behavior of the mail client.

8. The method of claim 1,
   wherein delaying subsequent mail requests comprises attenuating transmission of the subsequent mail requests.

9. The method of claim 1,
   wherein delaying subsequent mail requests is suspended in the event it is determined that a user is manually initiating rapidly repeated mail requests.

10. A method of moderating traffic load on network servers in a network where electronic mail is retained for retrieval from at least one mail server, the method comprising:
    permitting a mail request for a mail client to pass through a proxy server to the mail server;
    delaying subsequent mail requests for the mail client at the proxy server until a predetermined condition has been satisfied, wherein the predetermined condition is a predetermined period of time that is dynamically determined based on past behavior of the mail client; and transmitting a message to the mail client providing information that the mail client's mail requests will be delayed as a result of the mail client's past behavior.

11. The method of claim 10, wherein transmitting a message comprises providing instructions on how to modify mail client software.

12. A method of moderating traffic load on network servers in a network where electronic mail is retained for retrieval from at least one mail server, the method comprising:

permitting a mail request for a mail client to pass through a proxy server to the mail server;

delaying subsequent mail requests for the mail client at the proxy server until a predetermined condition has been satisfied, wherein the predetermined condition is a combination of a predetermined time period and receipt of a notification from the mail server that mail has been received for the mail client at the mail server, whichever occurs first, and wherein the predetermined period of time is dynamically determined based on past behavior of the mail client; and transmitting a message to the mail client providing information that the mail client's mail requests will be delayed as a result of the mail client's past behavior.

13. A proxy server for use in a network where electronic mail is retained for retrieval from at least one mail server, the proxy server comprising:

a processor; and a memory including software instructions adapted to enable the proxy server to perform the steps of permitting a mail request for a mail client to pass through the proxy server to the mail server; and delaying subsequent mail requests for the mail client at the proxy server until a predetermined condition has been satisfied, wherein delaying subsequent mail requests is achieved by inserting multiple delays that are inserted at different points in a mail protocol.

14. The proxy server of claim 13, wherein the predetermined condition is a predetermined period of time.

15. The proxy server of claim 14, wherein the predetermined period of time is dynamically determined based on the amount of traffic load on the network.

16. The proxy server of claim 14, wherein the predetermined period of time is dynamically determined based on past behavior of the mail client.

17. The proxy server of claim 16, wherein the predetermined period of time is dynamically determined based on the amount of traffic load on the network.

18. The proxy server of claim 13, wherein the predetermined condition is a combination of a predetermined time period and receipt of a notification from the mail server that mail has been received from the mail client at the mail server, whichever occurs first.

19. The proxy server of claim 13 wherein delaying subsequent mail requests is suspended in the event it is determined that a user is manually initiating rapidly repeated mail requests.

20. The proxy server of claim 13 wherein delaying subsequent mail requests comprises attenuating transmission of the subsequent mail requests.

21. A proxy server for use in a network where electronic mail is retained for retrieval from at least one mail server, the proxy server comprising:

a processor; and a memory including software instructions adapted to enable the proxy server to perform the steps of:

permitting a mail request for a mail client to pass through the proxy server to the mail server;

delaying subsequent mail requests for the mail client at the proxy server until a predetermined condition has been satisfied, wherein the predetermined condition is a predetermined period of time that is dynamically determined based on past behavior of the mail client; and transmitting a message to the mail client providing information that the mail client's mail requests will be delayed as a result of the mail client's past behavior.

22. A method of moderating traffic load on network servers in a network where electronic mail is retained for retrieval from at least one mail server, the method comprising:

permitting a mail request for a mail client to pass through a proxy server to the mail server;

applying remedial handling of subsequent mail requests for the mail client at the proxy server until a predetermined condition has been satisfied, the remedial handling being selected from the group consisting of delaying and attenuating; and transmitting a message to the mail client providing information that the mail client's mail requests will be delayed as a result of the mail client's past behavior wherein the predetermined condition is a predetermined period of time that is dynamically determined based on past behavior of the mail client.

* * * * *